(12) United States Patent
Basch

(10) Patent No.: US 6,862,834 B2
(45) Date of Patent: Mar. 8, 2005

(54) METHOD OF FISH TAGGING AND DEVICE

(76) Inventor: Donald Basch, 4099 119th Ave. NW., Coon Rapids, MN (US) 55433

(*) Notice: Subject to any disclaimer, the term of this patent is extended or adjusted under 35 U.S.C. 154(b) by 0 days.

(21) Appl. No.: 10/279,163

(22) Filed: Oct. 25, 2002

(65) Prior Publication Data

US 2004/0079019 A1 Apr. 29, 2004

(51) Int. Cl.[7] .............................................. A01K 97/00
(52) U.S. Cl. ................................. 43/4.5; 43/4
(58) Field of Search ...................... 43/1, 4, 4.5; 40/300; 119/858

(56) References Cited

U.S. PATENT DOCUMENTS

| | | | | |
|---|---|---|---|---|
| 1,742,649 A | | 1/1930 | Eastman | |
| 2,548,104 A | | 4/1951 | Frison | 40/1.6 |
| 3,174,458 A | * | 3/1965 | Levy et al. | 606/116 |
| 3,828,454 A | * | 8/1974 | Hafner et al. | 40/27 |
| 4,277,902 A | | 7/1981 | Miniaci et al. | 40/2 |
| 4,581,834 A | * | 4/1986 | Zatkos et al. | 40/301 |
| 4,750,490 A | * | 6/1988 | Haw et al. | 606/117 |
| 4,753,031 A | | 6/1988 | Owen | 43/54.1 |
| D299,151 S | * | 12/1988 | Rietmann | D20/27 |
| 4,790,090 A | * | 12/1988 | Sharber | 40/300 |
| 4,807,379 A | | 2/1989 | Blumhof | 40/653 |
| 4,839,675 A | | 6/1989 | Owen | 354/76 |
| 4,882,861 A | | 11/1989 | Holmes et al. | 40/299 |
| 4,970,988 A | * | 11/1990 | Heisey | 119/215 |
| 5,761,843 A | * | 6/1998 | Lynch et al. | 43/4.5 |
| 5,920,053 A | | 7/1999 | DeBrouse | 235/375 |
| 5,979,752 A | * | 11/1999 | Holloway | 235/90 |
| 5,987,808 A | * | 11/1999 | Coles | 43/55 |
| 6,055,751 A | | 5/2000 | Easthope | 40/300 |
| 6,286,460 B1 | * | 9/2001 | Gudbjornsson | 119/200 |
| 2002/0017049 A1 | * | 2/2002 | Millett et al. | 43/11 |
| 2003/0015149 A1 | * | 1/2003 | Krey et al. | 119/858 |

FOREIGN PATENT DOCUMENTS

| | | | |
|---|---|---|---|
| DE | 3520986 | * | 12/1985 |
| ES | 2081773 | * | 3/1996 |

* cited by examiner

Primary Examiner—Peter M. Poon
Assistant Examiner—David J Parsley
(74) Attorney, Agent, or Firm—Angenehm Law Firm, Ltd.; N Paul Friederichs

(57) ABSTRACT

A method of fishing, including the steps of catching a fish; determining data, the data including at least one member selected from the group of: angler's name, location, time, date, length of fish, girth of fish, weight of fish, variety of fish, lure and notes; recording the data on a tag, the tag being a laminated tag; selectively sticking the tag to the fish; photographing the tag and the fish; removing the tag without injuring the fish; and returning the fish to the water.

10 Claims, 3 Drawing Sheets

METHOD OF FISH TAGGING AND DEVICE

FIELD OF THE INVENTION

The present invention relates to methods of tagging fish and more particularly to tagging fish while practicing catch-photo-release fishing.

BACKGROUND OF THE INVENTION

The sportsmanship of fishing has developed over time. In the early days, fish were perceived to be abundant and inexhaustible. Anglers would catch the number of fish they desired before stopping. If too many fish were caught, fish would be allowed to die and decompose.

Regulations were imposed to stop the over-harvesting of fish. Most if not all states and provinces distinguish between game and non-game species. Daily bag limits and possession limits seek to prevent over-harvesting. Still, fish especially trophy fish, became more and more elusive. Slot limits, which coordinates bag limits and size of the fish are now becoming popular.

Some astute anglers realized that catching the fish was where they found enjoyment. Cleaning and preparing fish, while enjoyable, was not what motivated them to fish. These anglers developed an new form of fishing, originally called catch and release. The fish after being caught was then released back into the water for another angler to catch and for the fish to bear more young.

Catch and release fishing was then later improved by photographing the fish. This method was called catch-photo-release fishing. This allowed the angler to have a momento to commemorate the event, while still allowing the fish to live.

These photographs and measurements have developed into a form of taxidermy. Casts are adjusted to the measurements provided by the angler, using various sculpting methods and the sculpture is painted the colors of the fish shown in the photograph. These mounts are primarily of fiberglass, instead of treated parts of the fish, and therefor allow the fish to be return to the water. The mount is not possible if the angler forgets the measurements.

Anglers encounter yet another problem. The photographs are unclear as to the size of the fish. Depending upon how the fish is held, the fish looks larger or smaller than the fish was in reality. Fisherman have learned which way to hold the fish to make the fish look the most impressive. As a result, the picture not the fish is appreciated by most fisherman. The size and shape of the fish in the photograph is considered a matter of trick photography.

What is needed is a method of inextricably joining the dimensions of the fish with the photograph. In this manner, the angler, who practices the method and retains the photograph of the fish can get a mounted fish whenever they desire. The angler does not have to remember the dimensions of any particular fish, which can be determined simply by examining the photograph. The method should not harm the fish and should provide a recording, preferably permanent, of the event. Such a method will foster popularity of catch-photo-release fishing and improve the population of trophy fish.

SUMMARY OF THE INVENTION

The present invention includes a method of fishing, including the steps of: catching a fish; determining data; recording the data on a tag; selectively sticking the tag to the fish; photographing the fish; removing the tag; and returning the fish to the water.

The data may include at least one member selected from the group of: angler's name, location, time, date, length of fish, girth of fish, weight of fish, variety of fish, lure and notes. More than one category of data may be collected and alternate categories of data may be collected.

The data is then recorded on a tag and the tag is selectively joined to the fish. The fish may now be photographed together with the tag. Once photographed, the tag is removed without injuring the fish; and the fish is returned to the water.

Advantageously, this method allows the angler to keep information relevant to the catch with the photograph by placing it in the photograph.

As advantageously, this method of catch-photo-release fishing allows an angler to know the size of the fish by keeping a recorded log of the catch in the form of a tag.

Yet another advantage is that the angler may record data, which is maintained with the photograph of the fish, without causing injury to the fish.

DETAILED DESCRIPTION

Figure 1:
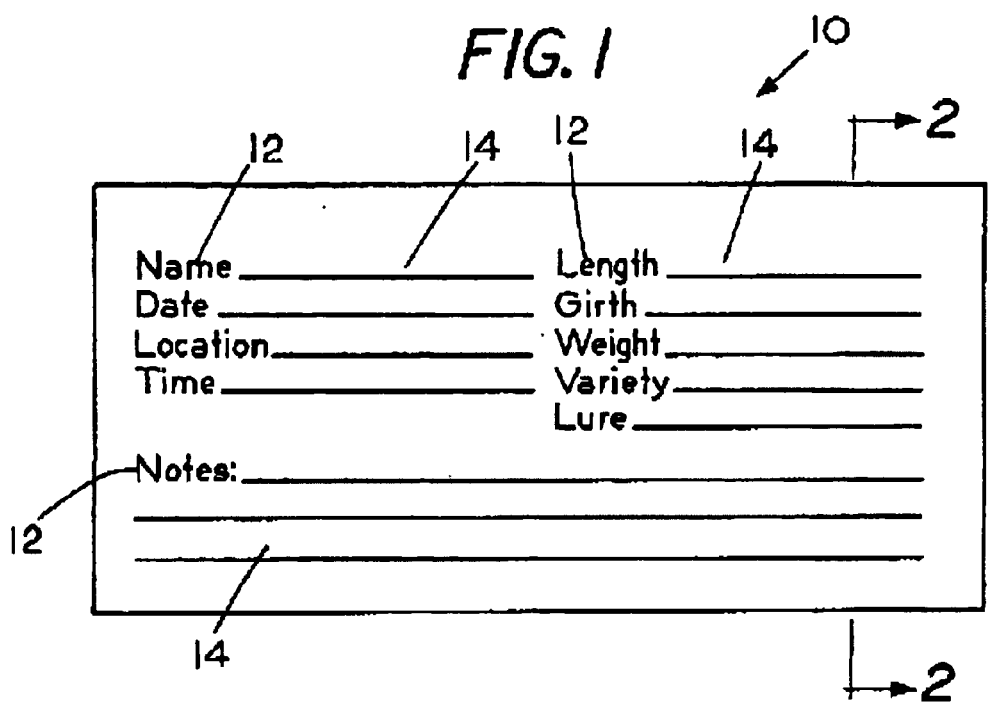
FIG. 1 is a top view of the tag.

The present invention is provided with a tag suitable for catch, photo and release fishing. The tag 10 is adapted for recording information and temporary securement to the fish 20. Once the fish is photographed together with the tag 10, the tag 10 is adapted to be removed from the fish 20 without causing injury thereto. The fish 20 may then be returned to the water.

The tag 10 may be pre-marked with data names 12 and data blanks 14. Data names 12 are indicia indicating the type of information that is to be recorded in a data blank 14. Data names may include "Name", "Date", "Location", "Time", "Length", "Girth", "Weight", "Variety", "Lure", "Notes", and other such indicators. Data blanks 14 are places on the tag 10, perhaps indicated with a line, where data, of the type described by the data names 12, may be recorded. For instance, next to the data name 12 called "Name", the angler may write their name. The tag 10 may be adapted such that the writing may be washable or permanent.

Figure 2:
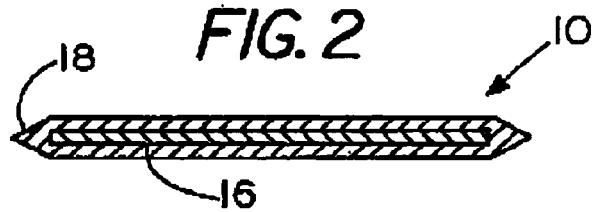
FIG. 2 is a cross sectional view of the tag taken along the lines 2—2 in FIG. 1.
Figure 3:
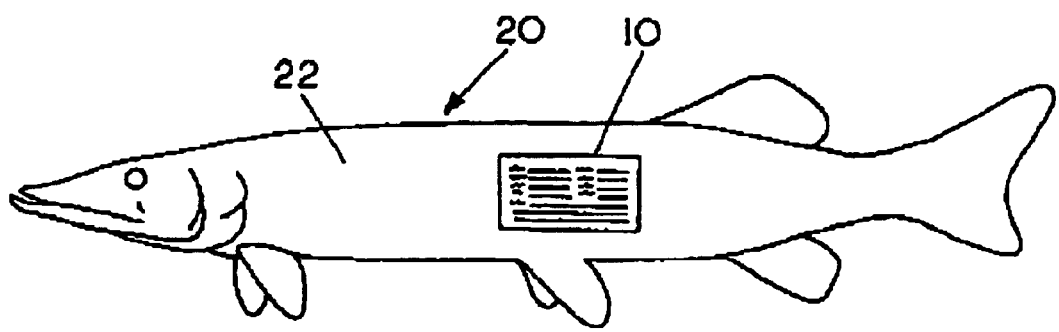
FIG. 3 is a side view of a fish with the tag mounted thereon.
Figure 4:
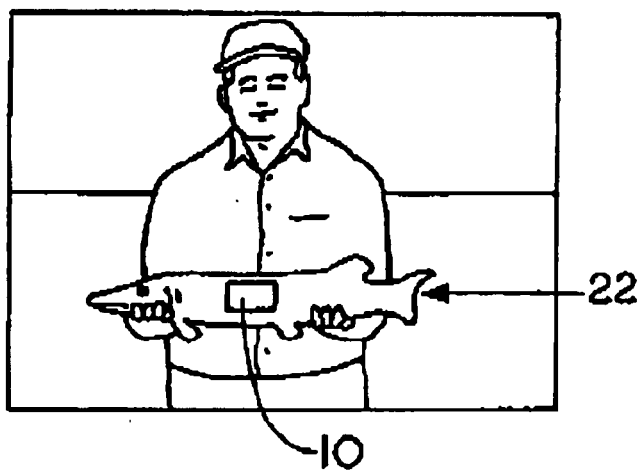
FIG. 4 is a front view of a photograph showing the angler, fish and tag mounted on the fish.

The tag 10 as shown in FIG. 2 may be a laminate, such as inner layer 16, which may be card stock, with an outer layer 18, which may be clear polymer. Alternatively, the tag 10 may be formed of a hydophobic material such as plastic. The outer layer 16 or surface is desirably non-porous such that it forms a weak vacuum seal when placed on the slime coating 22 of the fish 20. Alternatively, the outer layer 16 or outer surface may stick to the slime 22 in a weak adhesive manner. The tag 10 is adapted to stick only sufficiently strong to hold the tag 10, during photographing of the fish 20 as shown in FIG. 4. In this manner, the tag 10 can easily be removed without causing damage or injury to the slime coating 22 of the fish 20.

Figure 6:
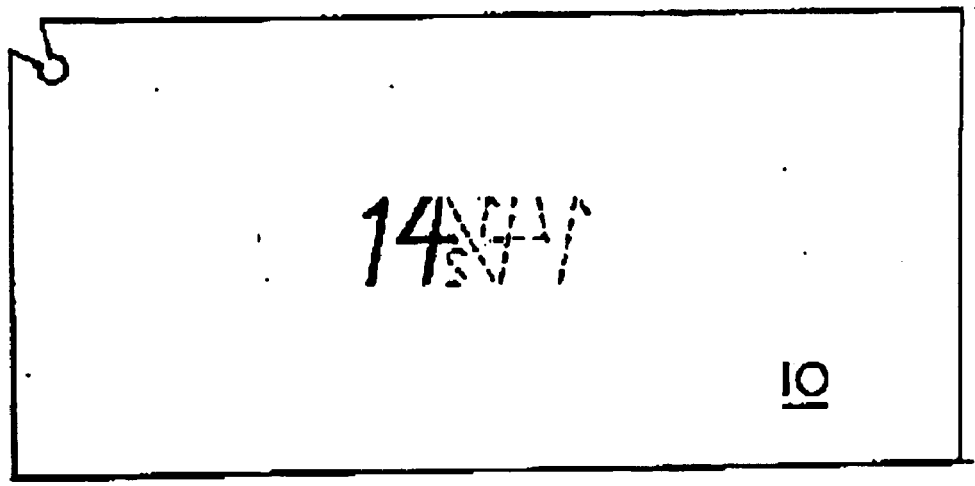
FIG. 6 is an alternative embodiment of the tag.
Figure 7:
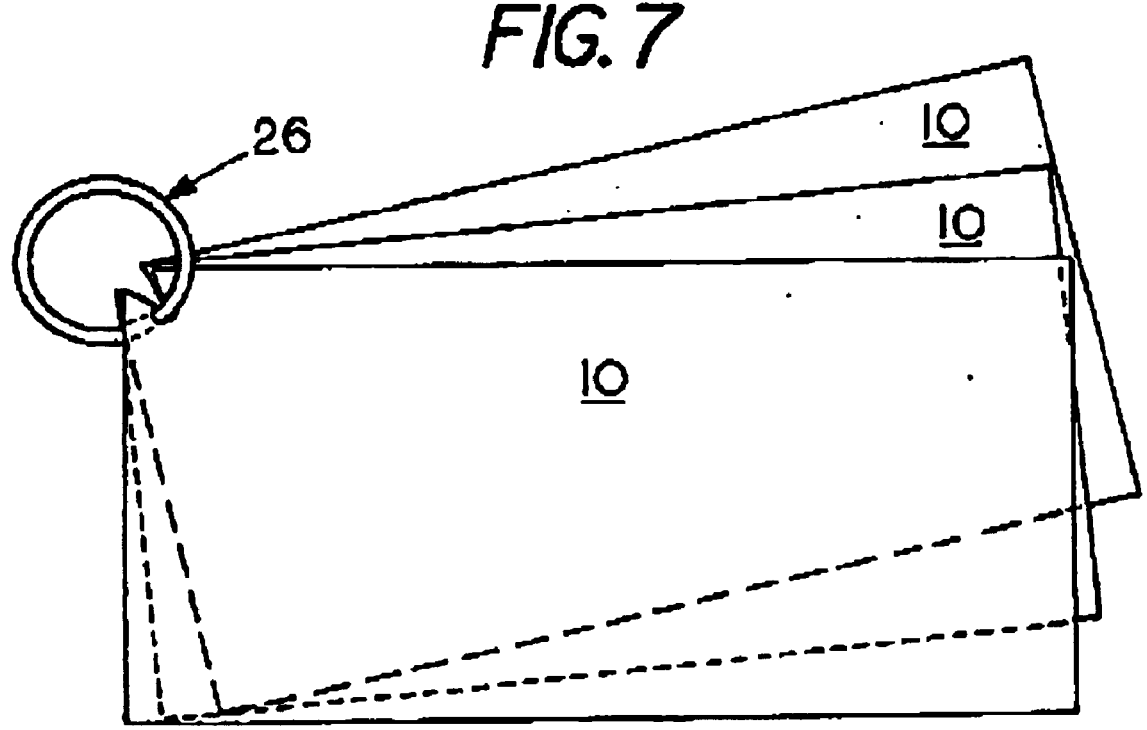
FIG. 7 is a prospective view of a ring of tags.

The most preferred embodiment is shown in FIGS. 6 and 7. The tag 10 may be 2½ inches by 1½ inches, although alternate sizes and shapes may be used without departing from the spirit and scope of the invention. The tags 10 may be numbered perhaps starting at fourteen inches and extending on up as desired. Both sides of the tag 10 may be printed in this manner with whole numbers (in inches) on one side and half inch increments on the other side. The inches, or other form of measurement indicium, may be the only data recorded or recordable on the tag 10 and such data is pre-recorded. The tags 10 are selectively secured to a ring 26, perhaps metal or plastic, and are removable for use with a fish 20. The ring 26 may be approximately 1¼ inches in diameter, although different sizes and shapes may be employed without departing from the spirit and scope of the invention.

Figure 5:
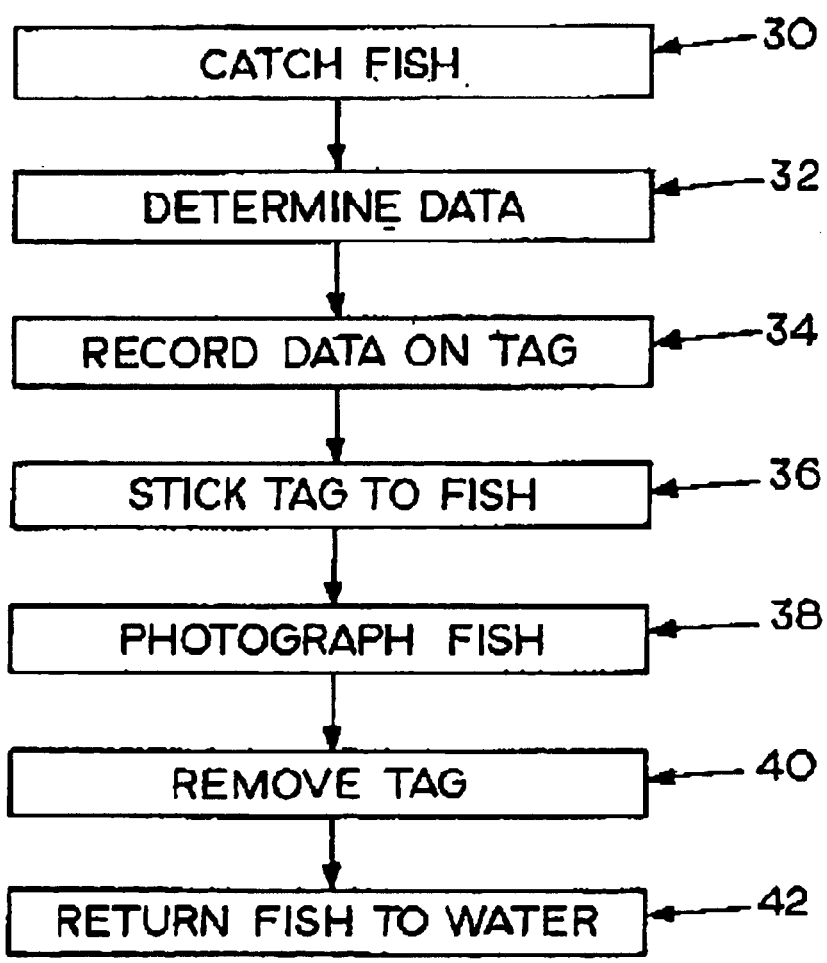
FIG. 5 is a flow chart showing the method of the present invention.

In operation, an angler may catch a fish 20 that the angler wishes to photograph as shown in box 30 of FIG. 5. Data such as the angler's name, location, time, date, length of fish, girth of fish, weight of fish, variety of fish, lure used and notes may be gathered, e.g., determined, as shown in box 32. Particular types of data collected may be altered based upon the type of fishing. For instance, tags 10 may be made for a single specie of fish such that the angler does not collect or record the specie on the tag 10.

The data may be recorded on a tag 10 as shown in box 34. The data may be removable from the tag 10, but preferably is permanently in-scripted. A ball-point pen, wax pen or other such writing instrument commonly known and used for writing may be used for such recordation.

The tag 10 is gently secured to the fish 20, after the data has been written on the tag 10 as shown in box 36. The securement is selective in nature such that when the fish is released, the tag 10 remains with the angler, not the fish. The tag 10 secures to the fish 20, using the slime coating 22 of the fish 20 to hold the tag 10 to the fish 20.

The tagged fish 20 may then be held by the angler for photographs as shown in box 38 of FIG. 5. The tag 10 may be photographed together with the fish 20 such that the recorded data becomes a part of the photograph and is visible in the photograph. In this manner, the angler has a recording of data relevant to the fish 20 permanently recorded and permanently joined to the photograph.

The tag 10 may then be removed from the fish 20, box 40, and the fish returned to the water, as shown in box 42. The tag 10 is preferably is removable from the slime 22 of the fish 20, leaving the slime 22 with the fish 20 such that the slime 22 continues to protect the fish 20 from disease and other health and life threatening problems. The tag 10 may be kept together with the photograph and framed, placed in an album or otherwise maintained for future viewing.

Although the present invention has been described with reference to preferred embodiments, workers skilled in the art will recognize changes may be made in form and detail without departing from the spirit and scope of the invention.

I claim:

1. Angling equipment, comprising:

a tag adapted to join to a slime coating of a fish, the tag having data identifying the size of a fish; the tag having in exterior surface selectively securable to and selectively removable from the slime coating of a fish without the use of mechanical fasteners.

2. The device of claim 1 wherein the tag further comprises:

a laminated card stock.

3. A method of fishing, comprising the steps of:

catching a fish;

determining data;

selectively sticking a tag to the fish without the use of mechanical fasteners;

photographing the fish;

removing the tag before returning the fish to the water; and returning the fish to the water after removing the tag.

4. The method of claim 3 wherein the data comprises at least one member selected from the group consisting of: angler's name, location, time, date, length of fish, girth of fish, weight of fish, variety of fish, lure and notes.

5. The method of claim 3 wherein the data is permanently recorded on the tag.

6. The method of claim 3 further comprising the step of keeping the photograph with the tag.

7. The method of claim 3 wherein the tag is a laminated tag.

8. The method of claim 3 further comprising photographing the tag, while photographing the fish.

9. The method of claim 3 wherein the step of removing comprises the step of removing the tag without causing injury to the fish.

10. The method of claim 3 wherein the step of selectively sticking further comprises the step of using slime from the fish to secure the tag to the fish.

\* \* \* \* \*